(12) United States Patent
Kim et al.

(10) Patent No.: US 8,247,132 B2
(45) Date of Patent: Aug. 21, 2012

(54) HEAT RECOVERY APPARATUS AND FUEL CELL HAVING THE SAME

(75) Inventors: Jinho Kim, Seoul (KR); Jae-yong Lee, Yongin-si (KR); Kyung-hwan Choi, Suwon-si (KR); Lei Hu, Yongin-si (KR)

(73) Assignee: Samsung SDI Co., Ltd., Suwon-si, Gyeonngi-do (KR)

( * ) Notice: Subject to any disclaimer, the term of this patent is extended or adjusted under 35 U.S.C. 154(b) by 1134 days.

(21) Appl. No.: 12/120,351

(22) Filed: May 14, 2008

(65) Prior Publication Data

US 2009/0155654 A1    Jun. 18, 2009

(30) Foreign Application Priority Data

Dec. 18, 2007  (KR) .................. 10-2007-0133704

(51) Int. Cl.
*H01M 8/22* (2006.01)

(52) U.S. Cl. ........ 429/506; 429/408; 429/424; 429/425; 429/456; 429/462; 429/490; 429/513; 429/515

(58) Field of Classification Search .................. 429/408, 429/417, 437, 462, 490, 506, 513, 515, 424–428, 429/455–457

See application file for complete search history.

(56) References Cited

U.S. PATENT DOCUMENTS

| | | | |
|---|---|---|---|
| 2005/0118490 A1* | 6/2005 | Sano et al. ..................... | 429/38 |
| 2005/0164059 A1* | 7/2005 | Yang et al. ..................... | 429/26 |
| 2008/0113229 A1* | 5/2008 | Oh ................................ | 429/13 |

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

Provided are a heat recovery apparatus recovering heat generated from a membrane electrode assembly (MEA) and transmitting the heat to a fuel spreader so that a temperature difference between the MEA and the fuel spreader inside a fuel cell is reduced, and a fuel cell having the heat recovery apparatus. The fuel spreader supplies fuel having a uniform concentration to the MEA through the heat recovery apparatus, so that a fuel cell having a reduced total volume, a stable performance, and increased energy efficiency can be provided.

11 Claims, 4 Drawing Sheets

HEAT RECOVERY APPARATUS AND FUEL CELL HAVING THE SAME

CROSS-REFERENCE TO RELATED PATENT APPLICATION

This application claims the benefit of Korean Patent Application No. 10-2007-0133704, filed on Dec. 18, 2007, in the Korean Intellectual Property Office, the disclosure of which is incorporated herein in its entirety by reference.

BACKGROUND OF THE INVENTION

1. Field of the Invention

The present invention relates to a heat recovery apparatus and a fuel cell having the same, and more particularly, to a heat recovery apparatus recovering heat generated from a membrane electrode assembly (MEA) and transmitting the heat to a fuel spreader so that a temperature difference between the MEA and the fuel spreader inside a fuel cell is reduced, and to a fuel cell having the heat recovery apparatus.

2. Description of the Related Art

A fuel cell is a device in which chemical energy released by the oxidation of a liquid or gaseous fuel is converted directly into electrical energy. The fuel cell is a power generator continuously generating electric power as long as fuel is supplied thereto. As an example of the fuel cell, a direct alcohol fuel cell (DAFC) is a device that directly supplies alcohol to an anode as fuel in order to generate electricity by reacting the alcohol with oxygen supplied to a cathode. A direct methanol fuel cell (DMFC) using methanol as fuel can also be a representative example.

FIG. 1 is a view of a schematic structure of a general fuel cell applied to a DMFC 100. Referring to FIG. 1, the DMFC 100 includes a membrane electrode assembly (MEA) 130, a fuel cartridge 200, a fuel spreader 120, and a fuel actuator 110. The MEA 130 is a stack of an anode 131, an electrolyte membrane 132, and a cathode 133. The fuel cartridge 200 stores methanol as fuel. The fuel spreader 120 disperses methanol supplied from the fuel cartridge 200 so that the methanol is uniformly spread on a front surface of the MEA 130. The fuel actuator 110 controls the amount of methanol supplied from the fuel cartridge 200 to the fuel spreader 120.

Here, FIG. 1 illustrates the MEA 130, perpendicular to the fuel spreader 120, in which the anode 131, the electrolyte membrane 132, and the cathode 133 are sequentially stacked. However, the stacking order and the structure can vary according to the design purpose. Under different conditions, the MEA can be horizontally disposed with respect to a fuel providing unit.

SUMMARY OF THE INVENTION

The present invention provides a heat recovery apparatus recovering heat generated from a membrane electrode assembly (MEA) and transmitting the heat to a fuel spreader.

The present invention also provides a fuel cell that includes the heat recovery apparatus and supplies fuel having a uniform concentration to the MEA.

According to an aspect of the present invention, there is provided a heat recovery apparatus, including: a first end portion connected to one side surface of a vertical wall interposed between membrane electrode assembly (MEA) unit cells of a fuel cell so as to recover heat generated from an MEA of the fuel cell; and a second end portion connected to a fuel spreader in order to transfer heat recovered from the MEA of the fuel cell to the fuel spreader.

According to another aspect of the present invention, there is provided a fuel cell, including at least one heat recovery apparatus of which a first end portion is connected to a lower end portion of a vertical wall interposed between MEA unit cells of the fuel cell, and a second end portion is connected to a fuel spreader.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 2:
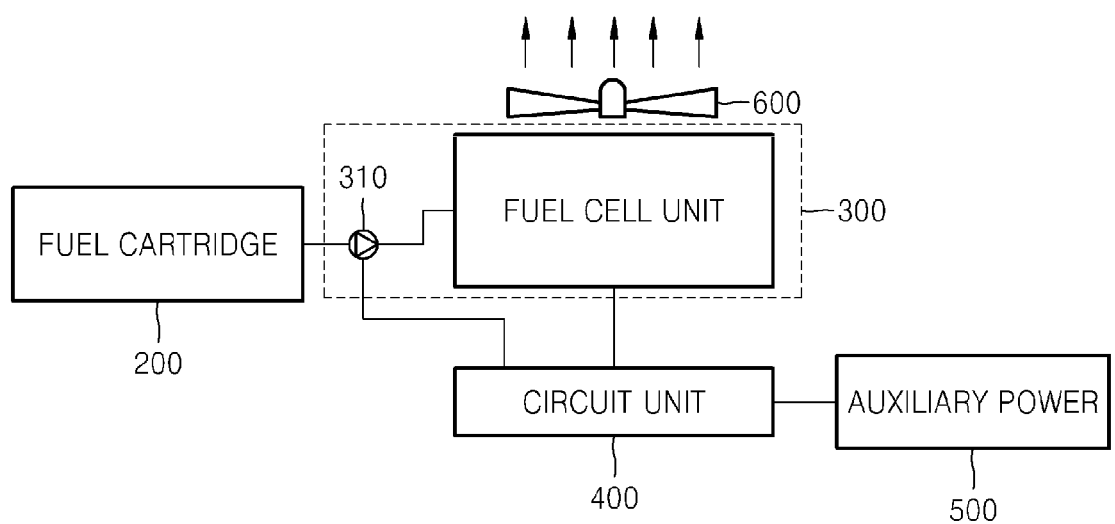
FIG. 2 is a view of a schematic structure of a fuel cell system according to an embodiment of the present invention.

FIG. 2 is a view of a schematic structure of a fuel cell system according to an embodiment of the present invention. Referring to FIG. 2, the fuel cell system of the present invention includes a fuel cartridge 200 storing fuel, a fuel cell unit 300 including a plurality of stacked unit cells, a fuel actuator 310 disposed between the fuel cartridge 200 and the fuel cell unit 300, a fan 600 disposed in the front side of the fuel cell unit 300, a circuit unit 400, and an auxiliary power 500.

The fuel cartridge 200 stores fuel including hydrogen that is supplied to the fuel cell unit 300 and is vaporized. For example, the fuel stored in the fuel cartridge 200 may be methanol, ethanol, or formic acid.

The fuel actuator 310 controls fuel supplied from the fuel cartridge 200 to the fuel cell unit 300. If a separate fuel pressure means is formed in the fuel cartridge 200, the fuel actuator 310 may be a valve. However, if a separate fuel pressure means is not formed in the fuel cartridge 200, the fuel actuator 310 may be a pump pumping fuel stored in the fuel cartridge 200 into the fuel cell unit 300.

The fan 600 discharges some water ($H_2O$) generated in the form of steam during operation of the fuel cell unit 300 out of the fuel cell system. The fan 600 may be optionally included.

The circuit unit 400 controls operation between the fuel actuator 310 and the fuel cell unit 300 so that an appropriate fuel according to an operation of the fuel cell unit 300 is supplied to the fuel cell unit 300. When the fan 600 is installed, the circuit unit 400 can control the number of rotations of the fan 600. When output of the fuel cell is not sufficient, the auxiliary power 500 supplies power to the circuit unit 400 until a sufficient output is prepared in the fuel cell system, and also supplies power necessary to operate the fuel actuator 310 through the circuit unit 400.

Figure 3:
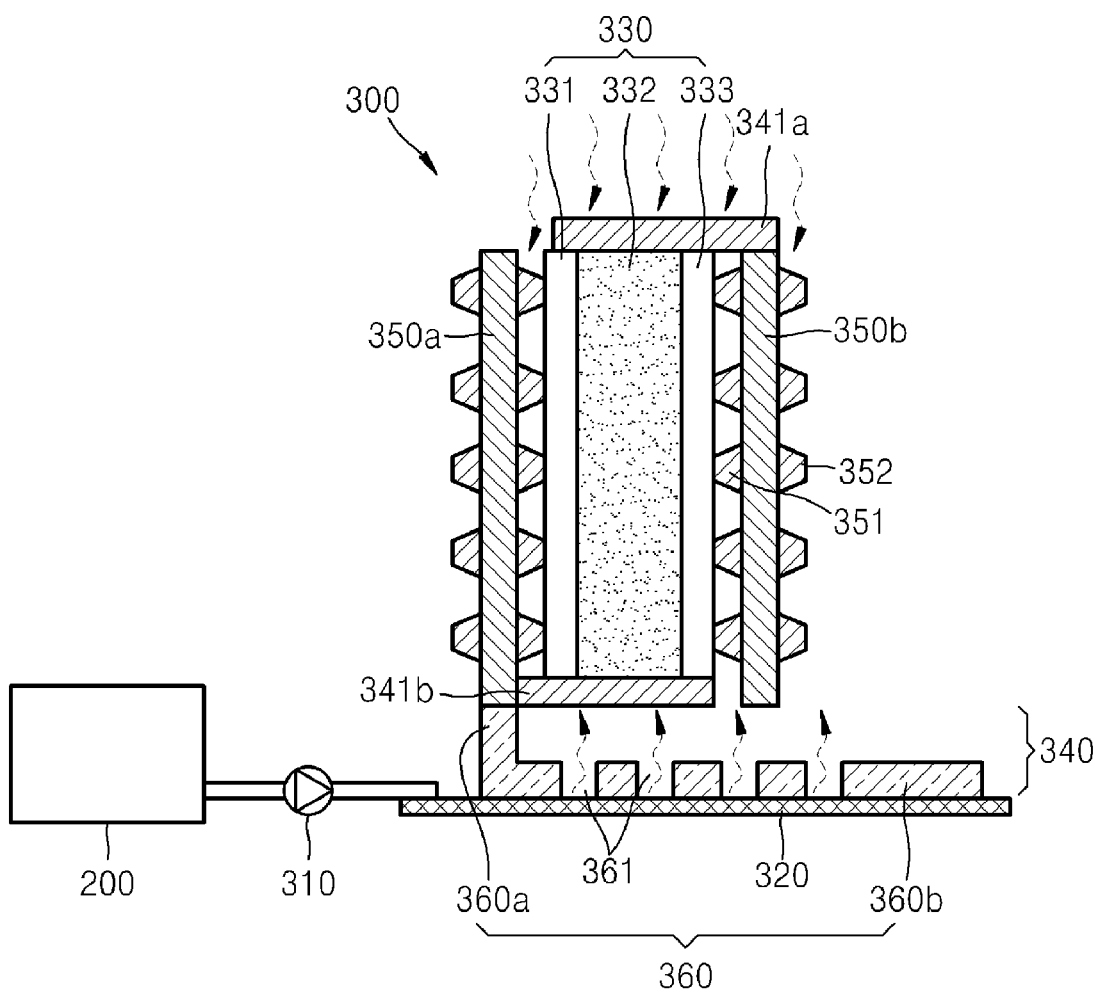
FIG. 3 is a view of a schematic structure of a fuel cell unit including a heat recovery apparatus according to an embodiment of the present invention.

FIG. 3 is a view of a schematic structure of a fuel cell unit 300 including a heat recovery apparatus according to an embodiment of the present invention. Hereinafter, structures of the heat recovery apparatus according to the present invention and a fuel cell having the same will be described. However, it is just for facilitating the understanding of the present invention, and it does not limit the range of the present invention in any sense.

Figure 1:
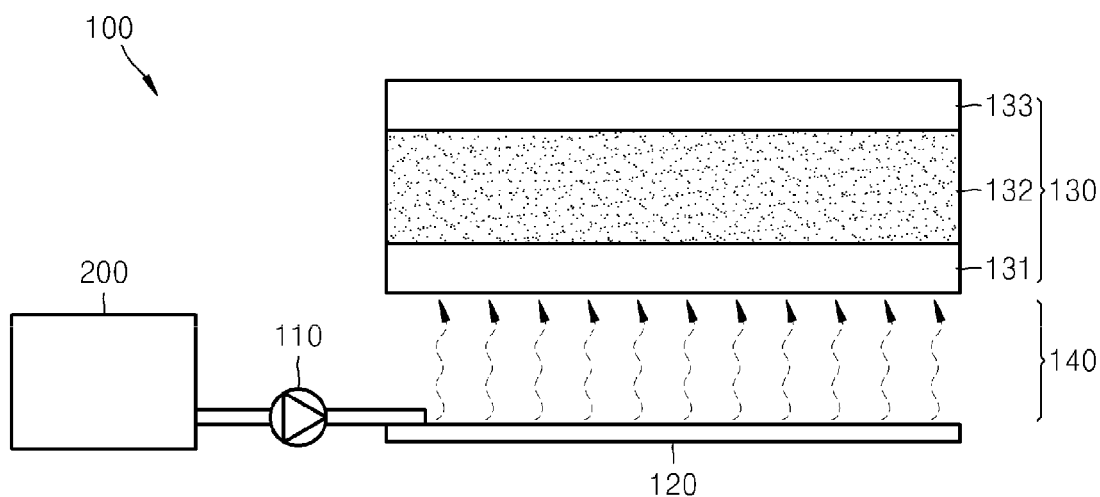
FIG. 1 is a view of a schematic structure of a general fuel cell applied to a direct methanol fuel cell (DMFC)

Referring to FIG. 1, the membrane electrode assembly (MEA) 130 has a structure in which the anode 131, the electrolyte membrane 132, and the cathode 133 are sequentially and horizontally stacked with respect to the fuel spreader 120. The stacking order and the structure of the MEA 130 can vary according to the design purpose of the fuel cell. Under conditions different to those of FIG. 3, the present invention can be applied to a structure in which the MEA 130 is vertically disposed with respect to the fuel spreader 120.

The fuel cell unit 300 includes a stack interposed between a first vertical wall 350a and a second vertical wall 350b that are spaced a predetermined distance. For convenience of explanation, the stack S1 consists of a unit cell 330 as illustrated in FIG. 3. The first vertical wall 350a and the second vertical wall 350b may be formed of material that does not easily react with oxygen, fuel, or water. The unit cell 330 is arranged parallel to the first and second vertical walls 350a and 350b between the first vertical wall 350a and the second vertical wall 350b. The unit cell 330 and the first and second vertical walls 350a and 350b are vertically disposed over an evaporation layer 340. A fuel spreader 320 is disposed below the evaporation layer 340.

The fuel spreader 320 may be a material layer in which capillary action occurs or may be a structure having an internal structure in which capillary action occurs. For example, the fuel spreader 320 may be a porous material layer or a wick plate having a wick structure. Fuel reached the fuel spreader 320 from the fuel actuator 310 is uniformly spread over the entire region of the fuel spreader 320 by capillary action of the fuel spreader 320. Accordingly, the fuel is simultaneously supplied over the entire part of the surface contacting with the fuel spreader 320 disposed under the evaporation layer 340. Then, the fuel is volatilized while passing through the evaporation layer 340 and is introduced to the unit cell 330 in a gas phase. According to the embodiment of the present invention, the inside of the evaporation layer 340 may be empty, or the evaporation layer 340 may be formed of a porous ceramic or a porous polymer resin.

Protrusions 351 and 352 facing an anode 331 or a cathode 333 are sporadically formed on the side surfaces of the first vertical wall 350a and the second vertical wall 350b, respectively. The protrusions 351 and 352 function to maintain an interval between the first and second vertical walls 350a and 350 and the cathode 333 or the anode 331, and also function to collect current when a separate current collector is not installed in the MEA. The end portions of the protrusions 351 and 352 contact the anode 331 or the cathode 333. The interval between the second vertical wall 350b and the cathode 333 is opened downward, that is, toward the evaporation layer 340, and is closed with an upper cap 341a. Accordingly, fuel is introduced to the interval between the second vertical wall 350b and the cathode 333 from the evaporation layer 340. On the contrary, the interval between the first vertical wall 350a and the anode 331 is opened upward and is closed with a lower cap 341b. Accordingly, air is introduced to the interval between the second vertical wall 350b and the anode 331.

On the other hand, a plate (not shown) may be interposed between the first and second vertical walls 350a and 350b and the protrusions 351 and 352. In this case, the plate may be the same plate as a vertical plate interposed between the unit cell 330 that is the MEA including the cathode 333, the anode 331, and the electrolyte membrane 332.

A first end portion 360a of a heat recovery apparatus 360 is connected to a lower end portion of the first vertical wall 350a, and a second end portion 360b of the heat recovery apparatus 360 is connected to the fuel spreader 320. The first end portion of the heat recovery apparatus 360 is connected to the lower end portion of the first vertical wall 350a so as to conduct heat transferred to the first vertical wall 350a in order to recover heat generated from the MEA through the first vertical wall 350a. The second vertical wall 350b of the heat recovery apparatus 360 is connected to the fuel spreader 320 in order to transfer heat recovered from the MEA to the fuel spreader 320.

In an embodiment of the present invention, the heat recovery apparatus 360 may widely contact a surface of the fuel spreader 320 so as to cover the surface of the fuel spreader 320 in order to uniformly transfer the recovered heat over the entire surface of the fuel spreader 320. In this case, in order not to interrupt fuel supplied through the fuel spreader 320 as much as possible, the heat recovery apparatus 360 has a structure in which a plurality of pores 361 are formed.

Figure 4:
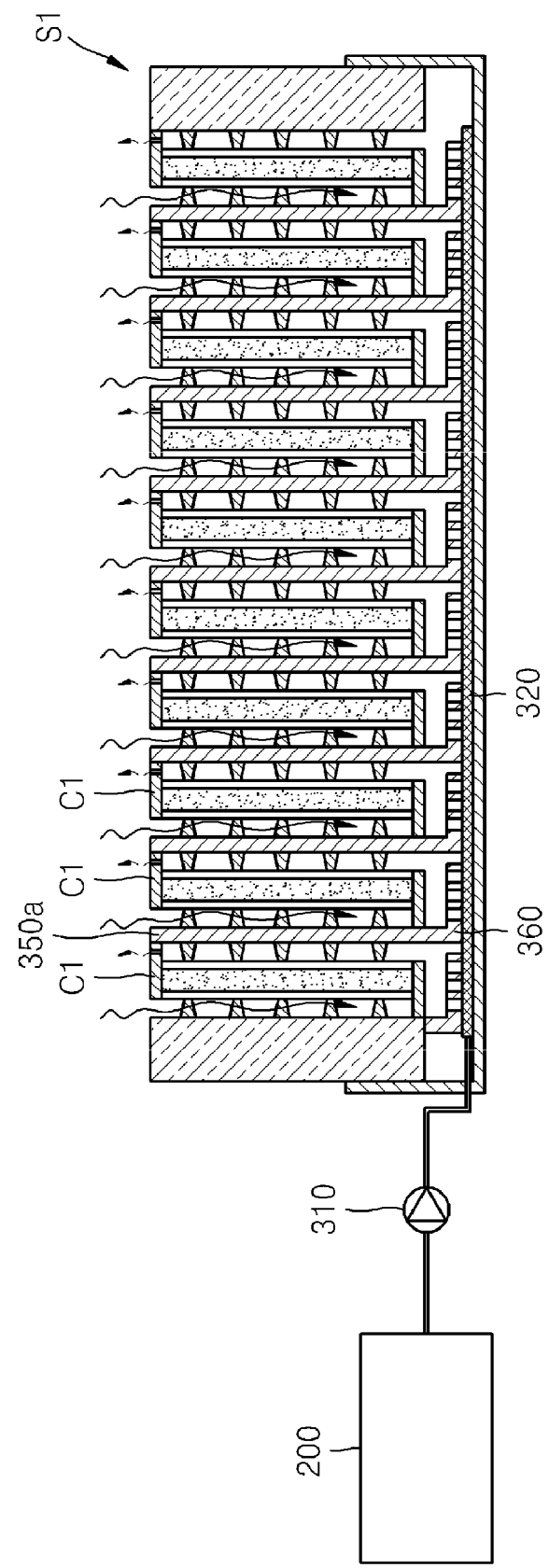
FIGS. 4 and 5 are views of a method of manufacturing a fuel cell unit using a heat recovery apparatus according to another embodiment of the present invention.
Figure 5:
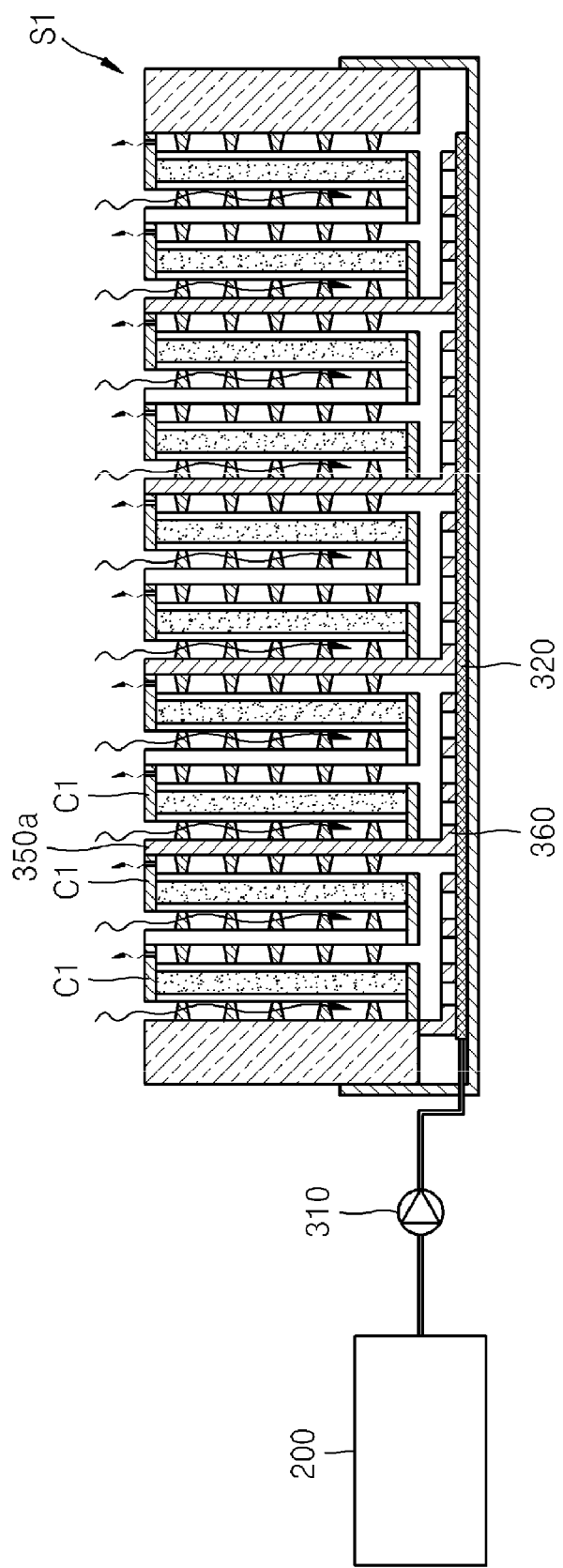

In an embodiment of the present invention, the heat recovery apparatus 360 and the first vertical wall 350a may be formed as a single body as illustrated in FIGS. 4 and 5.

In an embodiment of the present invention, the heat recovery apparatus 360 may be formed of a conductive material that can transfer heat transmitted through the first vertical wall 350a or the second vertical wall 350b to the fuel spreader 320.

According to the heat recovery apparatus 360 of the above described embodiments of the present invention, vaporized fuel between the MEA and the fuel providing unit is not condensed by reducing a temperature difference between the MEA and the fuel providing unit. Therefore, the fuel supplied from the fuel providing unit is prevented from becoming diluted, so that fuel having a uniform concentration can be regularly provided to the MEA.

FIGS. 4 and 5 are views of a method of manufacturing a fuel cell unit using a heat recovery apparatus according to another embodiment of the present invention, and in particular, are views illustrating a detailed structure of the heat recovery apparatus that can be applied to the present invention.

Hereinafter, structures of the heat recovery apparatus according to the present invention and a fuel cell having the same will be described. However, it is just for facilitating the understanding of the present invention, and it does not limit the range of the present invention in any sense.

In the fuel cell unit of FIG. 4, all vertical walls covering a plurality of unit cells C1 included in a stack S1 are connected to a fuel spreader through a heat recovery apparatus, so that heat generated in the unit cells C1 can be transmitted to the fuel spreader through the vertical walls and the heat recovery apparatus.

In the fuel cell unit of FIG. 5, only some vertical walls covering a plurality of unit cells C1 included in a stack S1 are connected to a fuel spreader through a heat recovery apparatus, so that heat generated in the unit cells C1 can be transmitted to the fuel spreader through the vertical walls and the heat recovery apparatus. In FIG. 5, only a vertical wall randomly selected from a plurality of vertical walls is connected to a fuel spreader through a heat recovery apparatus. However, this is only one example of the present invention, and the selecting of a vertical wall that should be connected to the fuel spreader through the heat recovery apparatus may vary according to design purpose of the fuel cell.

By applying a heat recovery apparatus of the present invention, a fuel cell having a reduced total volume, a stable performance, and increased energy efficiency can be provided.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A heat recovery apparatus comprising:
   a first end portion connected to one side surface of a vertical wall interposed between membrane electrode assembly (MEA) unit cells of a fuel cell so as to recover heat generated from an MEA of the fuel cell; and
   a second end portion connected to a fuel spreader in order to transfer heat recovered from the MEA of the fuel cell to the fuel spreader, the second end portion having a surface facing the MEA and an opposing surface connected to the fuel spreader.

2. The heat recovery apparatus of claim 1, wherein the heat recovery apparatus is formed of a conductive material that can transfer heat from the vertical wall to the fuel spreader.

3. The heat recovery apparatus of claim 1, wherein the first end portion and the vertical wall are formed as a single body.

4. The heat recovery apparatus of claim 1, wherein the second end portion has a cellular structure in which a plurality of pores, through which fuel vaporized by the fuel spreader can pass, are formed.

5. The heat recovery apparatus of claim 1, wherein the fuel spreader includes a material layer in which capillary action occurs or a structure having an internal structure in which capillary action occurs.

6. A fuel cell comprising at least one heat recovery apparatus of which a first end portion is connected to a lower end portion of a vertical wall interposed between MEA unit cells of the fuel cell, and a second end portion is connected to a fuel spreader, the second end portion having a surface facing the MEA and an opposing surface connected to the fuel spreader.

7. The fuel cell of claim 6, wherein at least one vertical wall selected from a plurality of vertical walls that are disposed in a stack is connected to the fuel spreader through the heat recovery apparatus.

8. The heat recovery apparatus of claim 1, wherein the second end portion has a cellular structure in which a plurality of pores, through which fuel vaporized by the fuel spreader can pass, are formed.

9. The heat recovery apparatus of claim 1, wherein the first end portion extends vertically from the vertical wall to the fuel spreader.

10. The fuel cell of claim 6, wherein the first end portion extends vertically from the vertical wall to the fuel spreader.

11. The fuel cell of claim 6, wherein the fuel spreader includes a material layer in which capillary action occurs or a structure having an internal structure in which capillary action occurs.

* * * * *